United States Patent
Zhao et al.

(10) Patent No.: US 10,233,376 B2
(45) Date of Patent: Mar. 19, 2019

(54) DISINTEGRATABLE CARBON COMPOSITES, METHODS OF MANUFACTURE, AND USES THEREOF

(71) Applicants: Lei Zhao, Houston, TX (US); Zhiyue Xu, Cypress, TX (US)

(72) Inventors: Lei Zhao, Houston, TX (US); Zhiyue Xu, Cypress, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 0 days.

(21) Appl. No.: 15/273,843

(22) Filed: Sep. 23, 2016

(65) Prior Publication Data

US 2018/0086964 A1    Mar. 29, 2018

(51) Int. Cl.
| | |
|---|---|
| C09K 8/42 | (2006.01) |
| C09K 8/56 | (2006.01) |
| C04B 35/52 | (2006.01) |
| C04B 35/80 | (2006.01) |
| C08K 7/24 | (2006.01) |
| C22C 21/06 | (2006.01) |
| C22C 23/02 | (2006.01) |
| E21B 33/12 | (2006.01) |
| C22C 19/03 | (2006.01) |
| C22C 19/00 | (2006.01) |
| C22C 23/00 | (2006.01) |
| C22C 18/00 | (2006.01) |
| C22C 21/00 | (2006.01) |
| C22C 38/06 | (2006.01) |

(52) U.S. Cl.
CPC ............ *C09K 8/426* (2013.01); *C08K 7/24* (2013.01); *C09K 8/56* (2013.01); *C22C 18/00* (2013.01); *C22C 19/007* (2013.01); *C22C 19/03* (2013.01); *C22C 21/00* (2013.01); *C22C 21/06* (2013.01); *C22C 23/00* (2013.01); *C22C 23/02* (2013.01); *C22C 38/06* (2013.01); *E21B 33/12* (2013.01); *C08K 2201/003* (2013.01); *C08K 2201/005* (2013.01)

(58) Field of Classification Search
None
See application file for complete search history.

(56) References Cited

U.S. PATENT DOCUMENTS

| | | |
|---|---|---|
| 4,799,956 A | 1/1989 | Vogel |
| 6,105,596 A | 8/2000 | Hoyes et al. |

(Continued)

FOREIGN PATENT DOCUMENTS

| | | |
|---|---|---|
| WO | 2015069402 A1 | 5/2015 |
| WO | 2016032493 A1 | 3/2016 |

OTHER PUBLICATIONS

Pohlmann et al.; "Magnesium alloy-graphite composites with tailored heat conduction properties for hydrogen storage applications", International Journal of Hydrogen Energy 35 (2010) pp. 12829-12836.

(Continued)

*Primary Examiner* — John J Figueroa
(74) *Attorney, Agent, or Firm* — Cantor Colburn LLP

(57) ABSTRACT

A carbon composite is disclosed, including a plurality of carbon grains, wherein each of the plurality of carbon grains includes a plurality of pores, and a binder disposed between the plurality of carbon grains to bond the plurality of carbon grains, wherein the binder is a disintegrable binder.

25 Claims, 2 Drawing Sheets

(56) References Cited

U.S. PATENT DOCUMENTS

| | | | |
|---|---|---|---|
| 7,438,839 B2 | 10/2008 | Simpson et al. | |
| 7,470,468 B2 | 12/2008 | Mercuri et al. | |
| 9,284,229 B2 * | 3/2016 | Zhao | C04B 35/536 |
| 9,505,151 B2 * | 11/2016 | Xu | B29C 43/003 |
| 2013/0062067 A1 | 3/2013 | Guest et al. | |
| 2013/0195708 A1 | 8/2013 | Klett et al. | |
| 2014/0196899 A1 | 7/2014 | Jordan et al. | |
| 2015/0122483 A1 | 5/2015 | Xu et al. | |
| 2015/0176363 A1 * | 6/2015 | Mazyar | E21B 33/12 166/179 |
| 2016/0200580 A1 * | 7/2016 | Liu | C01B 31/04 428/407 |
| 2016/0217888 A1 * | 7/2016 | Xiang | E21B 17/003 |
| 2017/0275950 A1 * | 9/2017 | Spencer | E21B 10/567 |

OTHER PUBLICATIONS

Tikhomirov et al.; "The chemical vapor infiltration of exfoliated graphite to produce carbon/carbon composites", Carbon 49 (2011) pp. 147-153.

PCT International Search Report and Written Opinion; International Application No. PCT/US2017/048188; International Filing Date: Aug. 23, 2017; dated Nov. 17, 2017; pp. 1-12.

* cited by examiner

DISINTEGRATABLE CARBON COMPOSITES, METHODS OF MANUFACTURE, AND USES THEREOF

BACKGROUND

Field of the Disclosure

This disclosure is directed to carbon composites, and in particular to carbon composites comprising carbon with a disintegrable binder, their methods of manufacture, and articles formed therefrom.

Background of the Art

Wellbores are drilled in subsurface formations for the production of hydrocarbons (oil and gas). Hydrocarbons are trapped in various traps or zones in the subsurface formations at different depths. In many operations, such as fracturing, it is required to provide sealing devices (such as packers, bridge plugs, etc.) in a downhole location to facilitate production of oil and gas. After such operations, sealing devices must be removed or destroyed before following operations can begin. Such removal operations may be costly and/or time consuming.

It is desired to provide sealing articles that can provide sufficient and stable sealing performance at a wide range of temperatures and pressures while providing desired and predictable disintegration characteristics.

The disclosure herein provides controlled disintegrable carbon composites and systems using the same for downhole applications.

SUMMARY

In one aspect, a carbon composite is disclosed, including a plurality of carbon grains, wherein each of the plurality of carbon grains includes a plurality of pores, and a binder disposed between the plurality of carbon grains to bond the plurality of carbon grains, wherein the binder is a disintegrable binder.

In another aspect, a method to form a carbon composite is disclosed, including comprising providing a carbon powder comprising a plurality of carbon grains, wherein each of the plurality of carbon grains includes a plurality of pores, providing a binder powder, mixing the carbon powder and the binder powder to form a carbon composite powder, and flowing the binder powder to form a binder between the plurality of carbon grains to bond the plurality of carbon grains, wherein the binder is a disintegrable binder.

In another aspect a downhole system is disclosed, including a downhole element including a carbon composite, the carbon composite including, a plurality of carbon grains, wherein each of the plurality of carbon grains includes a plurality of pores, and a binder disposed between the plurality of carbon grains to bond the plurality of carbon grains, wherein the binder is a disintegrable binder.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The disclosure herein is best understood with reference to the accompanying figures, wherein like numerals have generally been assigned to like elements and in which.

DESCRIPTION OF THE EMBODIMENTS

Figure 1:
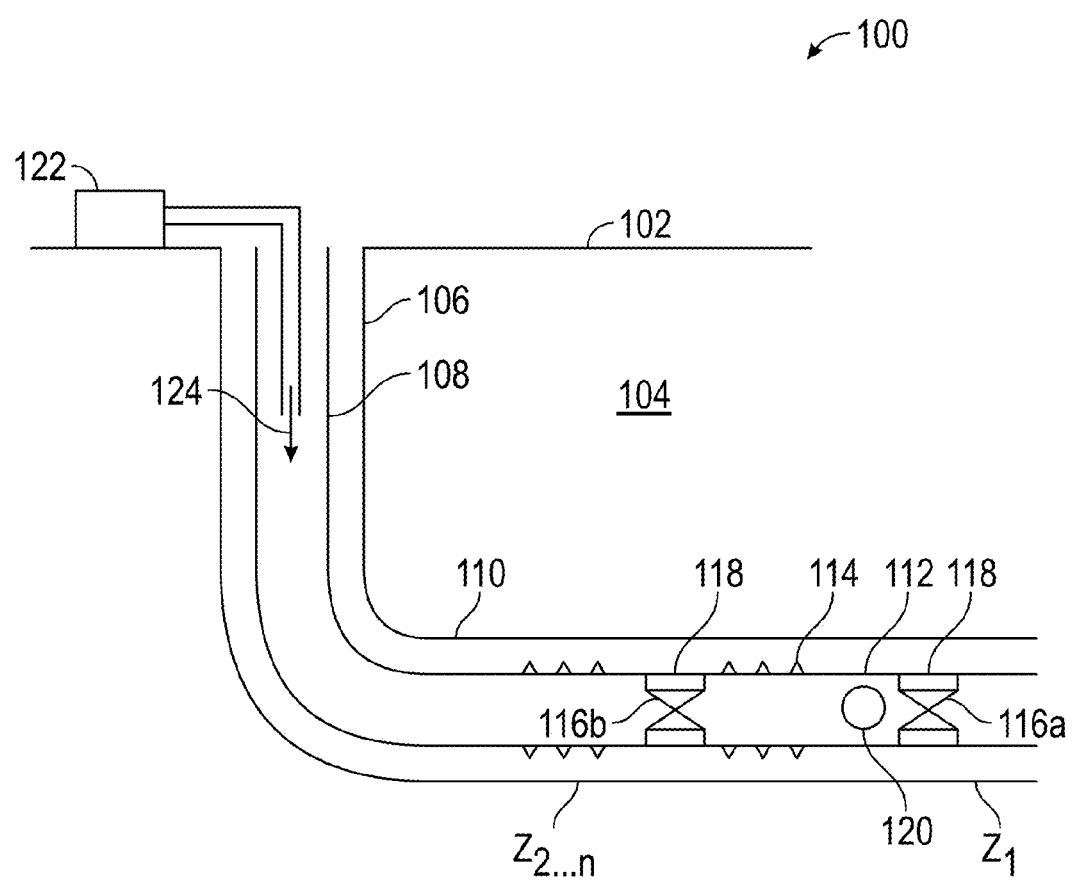
FIG. 1 is a schematic diagram of an exemplary drilling system that includes downhole elements according to embodiments of the disclosure.

FIG. 1 shows an exemplary embodiment of a downhole system to facilitate the production of oil and gas. In certain embodiments, system 100 allows for fracturing operations to facilitate production of oil and gas. System 100 includes a wellbore 106 formed in formation 104 with casing 108 disposed therein.

In an exemplary embodiment, a wellbore 106 is drilled from a surface 102 to a downhole location 110. Casing 108 may be disposed within wellbore 106 to facilitate production. In an exemplary embodiment, casing 108 is disposed through multiple zones of production Z1 . . . Zn in a downhole location 110. Wellbore 106 may be a vertical wellbore, a horizontal wellbore, a deviated wellbore or any other suitable type of wellbore or any combination thereof.

To facilitate downhole operations, such as fracturing operations, seals 116a, packers 116b, or other suitable downhole devices are utilized within casing string 108. Other suitable downhole devices can include, but are not limited to balls, plugs, seats, compression packing elements (premier seal), expanding packing elements (ARC seal), O-rings, bonded seals, bullet seals, SSSV dynamic seals, SSSV flapper seals, V rings, back up rings, drill bit seals, mud motor stators, PCP stators, ESP seals, and ESP space out subs. In certain embodiments, seals 116a can be used to selectively isolate zones Z1 . . . Zn for fracturing operations. In certain embodiments, packers 116b are utilized to isolate zones Z1 . . . Zn for fracturing operations. Other suitable downhole devices can be used for sealing and other purposes. In certain embodiments, downhole elements can be exposed to high temperatures, high pressures, and chemicals.

In certain embodiments, frac fluid 124 is pumped from a frac fluid source 122 to a downhole location 110 to flow through perforations 114 in a zone 112 isolated by downhole device 116a, b. Advantageously, fracturing operations allow for more oil and gas available for production.

After desired operations (such as fracturing operations) and before following operations, downhole devices 116a, b, etc. are often removed or otherwise destroyed to allow the flow of oil and gas through casing 108. In an exemplary embodiment, downhole devices 116a, b are configured to seal against casing 108 of local zone 112 until a predetermined time at which downhole devices 116a,b disintegrate to facilitate the production of oil and gas. Advantageously, in an exemplary embodiment, the downhole devices 116a, b herein are formed of materials to have predictable and adjustable disintegration characteristics while allowing for suitable sealing characteristics in a wide range of environments and conditions. In certain embodiments, disintegration can include, but is not limited to chemical dissolution, disintegration due to mechanical force, disintegration due to thermal heat, disintegration due to physical energy, etc.

In the illustrated embodiment, the downhole devices 116a, 116b can be made from carbon composites. Thus, in an embodiment, an article comprises the carbon composite. The carbon composite may be used to form all or a portion of an article.

Figure 2:
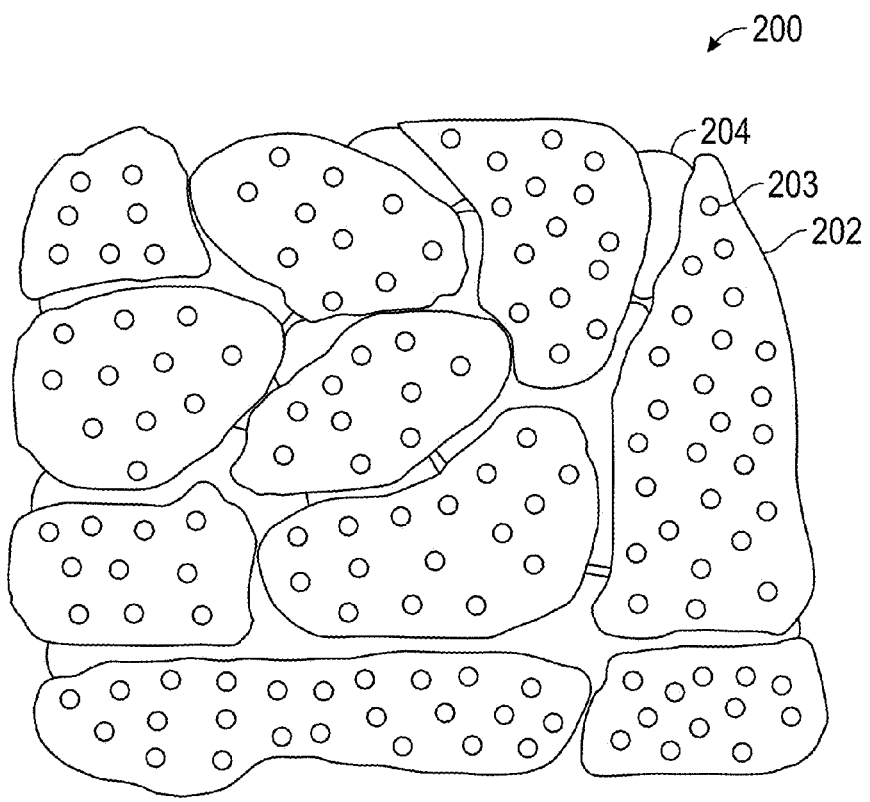
FIG. 2 is a schematic illustration of an exemplary embodiment of a disintegrable carbon composite.

FIG. 2 shows a carbon composite article 200 suitable for use with the downhole elements and articles described above. In an embodiment, the article is a packer, a seal, or an O-ring for use downhole systems such as the system 100 shown in FIG. 1.

In the illustrated embodiment, the carbon composite article 200 includes carbon grains 202 and a binder 204. Advantageously, the use of the carbon composite article 200 allows for a disintegrable material that has a wider temperature and pressure range for applications where retrieval may not be feasible. Further, the carbon composite article 200 may be used for applications requiring a wide range of temperatures and where temperatures may fluctuate and vary, such as steam injection applications.

In the illustrated embodiment, the carbon grains 202 can be any suitable form of carbon, including, but not limited to amorphous carbon, natural graphite, carbon fiber, etc. Potential embodiments of formation and structure of the carbon grains 202 can be found in U.S. Pat. No. 9,284,229 and U.S. patent application Ser. No. 14/072,016, both assigned to Baker Hughes Incorporated and both incorporated by reference herein.

Figure 3:
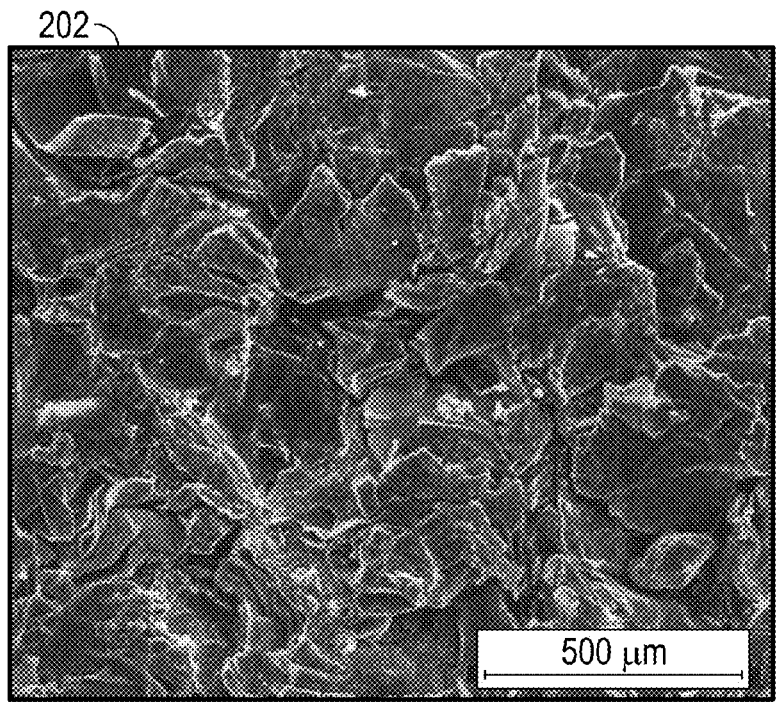
FIG. 3 shows graphite grains suitable for use with the disintegrable carbon composite shown in FIG. 2.

In the illustrated embodiment, the carbon grains 202 are flexible and provide for elasticity within the carbon composite article 200. In the illustrated embodiment, and as shown in FIG. 3, the carbon grains 202 can be between 5-500 micrometers in diameter and between 0.01 to 500 micrometers in thickness.

In the illustrated embodiment, the carbon grains 202 include pores 203 to allow for elasticity of the carbon grains 202. The elasticity allows for the carbon composite article 200 to be used as a sealing material that is chemically and thermally stable.

In certain embodiments, the carbon grains 202 are expanded graphite grains which include pores 203. Graphite is a layered material. Individual layers are held together with weak Van der Waals forces which are capable of intercalation with organic or inorganic molecules and eventual expansion to form pores 203. Intercalation is a process whereby an intercallant material is inserted between the individual carbon layers of graphite. A wide variety of chemicals have been used to intercalate graphite materials. These include acids, oxidants, halides, or the like.

Upon heating, the intercallant is converted from a liquid or solid state, to a gas phase. Gas formation generates pressure which pushes adjacent carbon layers apart resulting in expanded graphite.

In an embodiment, the expanded graphite of the disclosure is produced through the steps of: treating a graphite material such as natural graphite, kish graphite, pyrolytic graphite, etc., with sulfuric acid, nitric acid, chromic acid, boric acid, or halides such as $FeCl_3$, $ZnCl_2$, $SbCl_5$, to form an expandable graphite; rapidly heating the expandable graphite at a high temperature of, e.g., 800° C. or higher, so as to generate pyrolysis gas whose pressure is used to expand a space between graphite layers thereby forming the expanded graphite. In certain embodiments, the graphite grains can be expanded by any suitable method.

In the illustrated embodiment, the carbon grains 202 can be bonded together using a binder 204. Advantageously, the binder 204 enables the high mechanical strength of the carbon composite article 200 while allowing for the sealing characteristics described herein.

In the illustrated embodiment, the binder 204 is a disintegrable binder that can selectively and controllable disintegrate as desired. In certain embodiments, the binder 204 can disintegrate when exposed to a selected fluid, to allow the grains 202 to be washed away by a downhole fluid current.

In certain embodiments, the binder 204 is formed from a corrodible metal such as a controlled electrolytic metallic. Binder 204 materials may include: a magnesium alloy, a magnesium silicon alloy, a magnesium aluminum alloy, a magnesium zinc alloy, a magnesium manganese alloy, a magnesium aluminum zinc alloy, a magnesium aluminum manganese alloy, a magnesium zinc zirconium alloy, and a magnesium rare earth element alloy. Rare earth elements may include, but is not limited to scandium, yttrium, lanthanum, cerium, praseodymium, neodymium, and erbium. In certain embodiments, binder 204 can further include aluminum, nickel, iron, tungsten, copper, cobalt. Advantageously, the use of corrodible metal binders 204 allows for the use of the carbon composite article 200 in high temperature applications, including, but not limited to applications above 500 degrees Fahrenheit. In an exemplary embodiment, corrodible metal binders 204 allow for the carbon composite article 200 to disintegrate in high temperature environments after a desired amount of time and exposure to a selected fluid. In certain embodiments, corrodible metal binders 204 can be disintegrated or otherwise corroded via galvanic microcell reactions (anode-cathode reaction) when corrodible metal binders 204 contact electrolytic components in wellbore fluid, such as brines, acids, etc. In certain embodiments, cathode catalyst elements, such as micro galvanic cells are built into the corrodible metal binders 204. In certain embodiments, cathode catalyst elements can include nickel, iron, copper, cobalt, zinc, aluminum, tungsten, etc.

In other embodiments, the binder 204 can be a polymer including groups such as ester, amide, ether, or other groups that can be disintegrated by water or any other suitable fluid. In certain embodiments, the binder 204 can be polyurethane. Advantageously, the use of polymer binders 204 allows for the use of the carbon composite article 200 in lower temperature applications, including, but not limited to applications below 500 degrees Fahrenheit. In an exemplary embodiment, polymer binders 204 allow for the carbon composite article 200 to disintegrate in lower temperature environments after a desired amount of time and exposure to a selected fluid. In certain embodiments, polymer binder 204 can be disintegrated via thermal decomposition.

In other embodiments, the binder 204 can be other materials including, but not limited to toughened acrylics, epoxy, low melting point metals (such as aluminum, magnesium, zinc, bismuth, tin, lead and their alloys), etc. In certain embodiments, low melting point metals have melting points lower than carbon grains 202 melting point, but higher than required operation temperatures. After a desired operation, a heat source can be introduced to the carbon composite article 200 to disintegrate the binder 204 via melting. In certain embodiments, the binder 204 can include metals or their alloys including aluminum, manganese, zinc, iron, etc., in combination with a cathode catalyst element. In certain embodiments, metal binders 204 can be disintegrated or otherwise corroded via galvanic microcell reactions (anode-cathode reaction) when metal binders 204 contact electrolytic components in wellbore fluid, such as brines, acids, etc. In certain embodiments, cathode catalyst elements, such as micro galvanic cells are built into the metal binders 204. In certain embodiments, cathode catalyst elements can include nickel, iron, copper, cobalt, zinc, aluminum, tungsten, etc. In certain embodiments, the binder 204 can be formed from brittle materials. In certain embodiments, brittle materials can include, but are not limited to various aluminum or magnesium based intermetallic compounds, such as Al3Mg2, Al12Mg17, Mg2Ni, Mg2Si, Al3Ni, FeAl, MgZn, etc. A brittle material binder 204 can be selected to bind the carbon composite article 200 at a required maximum operation pressure and/or temperature, however may selectively fracture at a pressure and/or temperature higher than the required operation pressure and/or temperature. After a desired operation, the carbon composite article 200 can be introduced to elevated pressure and/or temperatures to disintegrate the binder 204 via fracturing. In certain embodiments, brittle materials can be a portion of the binder 204, while in other embodiments, brittle materials can form all of the binder 204. Brittle materials can form 5-100% of the binder 204. These materials can be in different shapes, such as particles, fibers, and wires. Combinations of the materials can be used.

In the illustrated embodiment, the binder 204 can be between 10 to 90 percent of the volume of the carbon composite article 200. By varying the amount of the binder 204 and the composition of the binder 204 relative to the carbon grains 202, the hardness and flexibility of the carbon composite article 200 can be varied.

The discovery allows the manufacture of carbon composites suitable for use as packers or seal materials for downhole applications. As another advantageous feature, the raw materials for the carbon composites are environmentally friendly and of low cost.

Various methods can be used to manufacture the carbon composites. In an embodiment, a method of forming a carbon composite comprises combining expanded graphite and at least one of a binder to form a combination; and compressing the combination under an isostatic pressure thereby forming the carbon composite.

Alternatively, an expanded graphite composition is first pressed to form a pre-form. The pre-form is then combined with a binder to form the carbon composite. If necessary, the filled pre-form can be further compressed.

Advantageously, the pre-form comprises an expanded graphite matrix and open pores connecting to each other. One way to produce open pores is to add a material such as wax to the expanded graphite before compressing the expanded graphite to make the pre-form. Upon the removal of the wax by heating, connecting open pores are formed in the expanded graphite matrix.

The binder is subsequently added to the pre-form through infiltration. In the instance where the binder is metal, the metallic binder can be heated to a molten state first, and then the molten metallic binder is poured to the pre-form. The metallic binder fills the open pores thereby forming the carbon composite.

The expanded graphite composition to make the pre-form comprises expanded graphite and optionally a reinforcement. Wax can also be included in the expanded graphite composition in order to make a pre-form having connecting open pores.

In another embodiment, the compressed expanded graphite, for example, one made by applying uniaxial force, is broken into small pieces by grounding, chopping or milling, for example, ball milling. The small pieces can be pressed to form a pre-form. Then the binder is added as described herein to the pre-form to provide the carbon composite. Alternatively, the small pieces can be blended with a binder or reinforcement, then hot or cold pressed to form the carbon composite. It is also to be appreciated that different combinations of the foregoing operations can be used and is contemplated.

In certain embodiments, the carbon grains 202 and the binder 204 can be mixed together in a powder form. The mixed powder can be evenly mixed, and then sintered to flow the binder 204 around the carbon grains 202 near the melting temperature of the binder 204. In certain embodiments, the mixed powder can be compressed and heated to flow the binder 204 around the carbon grains 202 near the melting temperature of the binder 204. The flowed binder 204 allows for molding of the carbon composite article 200.

Therefore in one aspect, a carbon composite is disclosed, including a plurality of carbon grains, wherein each of the plurality of carbon grains includes a plurality of pores, and a binder disposed between the plurality of carbon grains to bond the plurality of carbon grains, wherein the binder is a disintegrable binder. In certain embodiments, the carbon comprises amorphous carbon, natural graphite, carbon fiber, or a combination comprising at least one of the foregoing material. In certain embodiments, the plurality of carbon grains are a plurality of graphite grains. In certain embodiments, each of the plurality of graphite grains are between 5 to 500 micrometers in diameter. In certain embodiments, each of the plurality of graphite grains between are 0.01-500 micrometers in thickness. In certain embodiments, the binder is an ester polymer. In certain embodiments, the binder is an amide polymer. In certain embodiments, the binder is an ether polymer. In certain embodiments, the binder is polyurethane. In certain embodiments, the binder is a metal or an alloy. In certain embodiments, the binder is a controlled electrolytic metallic material. In certain embodiments, the binder is between 10 to 90 percent of the carbon composite by volume. In certain embodiments, the binder is at least one of a magnesium alloy, a magnesium silicon alloy, a magnesium aluminum alloy, a magnesium zinc alloy, a magnesium manganese alloy, a magnesium aluminum zinc alloy, a magnesium aluminum manganese alloy, a magnesium zinc zirconium alloy, and a magnesium rare earth element alloy. In certain embodiments, the binder is a low melting point metal or a low melting point alloy. In certain embodiments, the binder is at least one of bismuth, tin, and lead. In certain embodiments, the binder further comprises a cathode catalyst element. In certain embodiments, the cathode catalyst element is at least one of nickel, iron, copper, cobalt, zinc, aluminum and tungsten. In certain embodiments, the binder comprises a brittle material. In certain embodiments, the brittle material is between 5 to 100 percent of the binder. In certain embodiments, the brittle material is at least one of Al3Mg2, Al12Mg17, Mg2Ni, Mg2Si, Al3Ni, FeAl and MgZn.

In certain embodiments, the article is a downhole element. In certain embodiments, the article comprises at least one of a ball, a plug, a seat, a compression packing element, an expanding packing element, an O-ring, a bonded seal, a bullet seal, a dynamic seal, a flapper seal, a V ring, a back up ring, a drill bit seal, a mud motor stator, a PCP stator, a ESP seal, and a ESP space out sub.

In another aspect, a method to form a carbon composite is disclosed, including comprising providing a carbon powder comprising a plurality of carbon grains, wherein each of the plurality of carbon grains includes a plurality of pores, providing a binder powder, mixing the carbon powder and the binder powder to form a carbon composite powder, and flowing the binder powder to form a binder between the plurality of carbon grains to bond the plurality of carbon grains, wherein the binder is a disintegrable binder. In certain embodiments, the method further includes heating the carbon composite powder to flow the binder powder. In certain embodiments, the method further includes compressing the carbon composite powder to flow the binder powder. In certain embodiments, the method further includes sintering the carbon composite powder to flow the binder powder. In certain embodiments, the method further includes selectively disintegrating the binder to disintegrate the carbon composite.

In another aspect a downhole system is disclosed, including a downhole element including a carbon composite, the carbon composite including, a plurality of carbon grains, wherein each of the plurality of carbon grains includes a plurality of pores, and a binder disposed between the plurality of carbon grains to bond the plurality of carbon grains, wherein the binder is a disintegrable binder. In certain embodiments, the downhole element is at least one of a ball, a plug, a seat, a compression packing element, an expanding packing element, an O-ring, a bonded seal, a bullet seal, a dynamic seal, a flapper seal, a V ring, a back up ring, a drill bit seal, a mud motor stator, a PCP stator, a ESP seal, and a ESP space out sub.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A carbon composite comprising:
   a plurality of carbon grains, wherein each of the plurality of carbon grains is a form of carbon and includes a plurality of pores to allow for elasticity of the carbon grains; and
   a binder disposed between the plurality of carbon grains to bond the plurality of carbon grains, wherein the binder is a disintegrable binder.

2. The carbon composite of claim 1, wherein the carbon comprises amorphous carbon, natural graphite, carbon fiber, or a combination comprising at least one of the foregoing material.

3. The carbon composite of claim 1, wherein the plurality of carbon grains are a plurality of graphite grains.

4. The carbon composite of claim 3, wherein each of the plurality of graphite grains are between 5 to 500 micrometers in diameter.

5. The carbon composite of claim 3, wherein each of the plurality of graphite grains between are 0.01 to 500 micrometers in thickness.

6. The carbon composite of claim 1, wherein the binder is an ester polymer.

7. The carbon composite of claim 1, wherein the binder is an amide polymer.

8. The carbon composite of claim 1, wherein the binder is an ether polymer.

9. The carbon composite of claim 1, wherein the binder is polyurethane.

10. The carbon composite of claim 1, wherein the binder is between 10 to 90 percent of the carbon composite by volume.

11. The carbon composite of claim 1, wherein the binder is a magnesium alloy with a nickel catalyst.

12. The carbon composite of claim 11, wherein the binder is a controlled electrolytic metallic material.

13. The carbon composite of claim 12, wherein the binder is at least one of a magnesium alloy, a magnesium silicon alloy, a magnesium aluminum alloy, a magnesium zinc alloy, a magnesium manganese alloy, a magnesium aluminum zinc alloy, a magnesium aluminum manganese alloy, a magnesium zinc zirconium alloy, and a magnesium rare earth element alloy.

14. The carbon composite of claim 11, wherein the binder is a low melting point metal or a low melting point alloy.

15. The carbon composite of claim 14, wherein the binder is at least one of bismuth, tin, and lead.

16. The carbon composite of claim 11, wherein the binder further comprises a cathode catalyst element.

17. The carbon composite of claim 14, wherein the cathode catalyst element is at least one of nickel, iron, copper, cobalt, zinc, aluminum and tungsten.

18. The carbon composite of claim 1, wherein the binder comprises a brittle material.

19. The carbon composite of claim 18, wherein the brittle material is between 5 to 100 percent of the binder.

20. The carbon composite of claim 18, wherein the brittle material is Mg2Ni.

21. The carbon composite of claim 1, wherein the carbon composite is an article.

22. The article of claim 21, wherein the article comprises at least one of a ball, a plug, a seat, a compression packing element, an expanding packing element, an O-ring, a bonded seal, a bullet seal, a dynamic seal, a flapper seal, a V ring, a back up ring, a drill bit seal, a mud motor stator, a PCP stator, a ESP seal, and a ESP space out sub.

23. A downhole system, comprising:
a downhole element including a carbon composite, the carbon composite including:
a plurality of carbon grains, wherein each of the plurality of carbon grains is a form of carbon and includes a plurality of pores to allow for elasticity of the carbon grains; and
a binder disposed between the plurality of carbon grains to bond the plurality of carbon grains, wherein the binder is a disintegrable binder.

24. The downhole system of claim 23, wherein the downhole element is at least one of a ball, a plug, a seat, a compression packing element, an expanding packing element, an O-ring, a bonded seal, a bullet seal, a dynamic seal, a flapper seal, a V ring, a back up ring, a drill bit seal, a mud motor stator, a PCP stator, a ESP seal, and a ESP space out sub.

25. The downhole system of claim 23, wherein the plurality of carbon grains includes a plurality of graphite grains and the binder includes a magnesium alloy with a nickel catalyst.

* * * * *